United States Patent
Jung et al.

(10) Patent No.: US 7,448,546 B2
(45) Date of Patent: Nov. 11, 2008

(54) INVENTORY MANAGEMENT METHOD FOR REFRIGERATOR USING MOBILE TERMINAL

(75) Inventors: Hee Won Jung, Suwon-si (KR); Chul Yong Jeon, Yongin-si (KR)

(73) Assignee: Samsung Electronics Co., Ltd., Maetan-Dong, Yeongtong-Gu, Suwon-Si, Gyeonggi-Do (KR)

( * ) Notice: Subject to any disclaimer, the term of this patent is extended or adjusted under 35 U.S.C. 154(b) by 0 days.

(21) Appl. No.: 11/473,630

(22) Filed: Jun. 23, 2006

(65) Prior Publication Data

US 2007/0152048 A1    Jul. 5, 2007

(30) Foreign Application Priority Data

Dec. 30, 2005    (KR)    ............... 10-2005-0134834

(51) Int. Cl.
*G06F 19/00* (2006.01)
*G06F 17/00* (2006.01)
*G06Q 10/00* (2006.01)

(52) U.S. Cl. ............... 235/385; 235/375; 705/28

(58) Field of Classification Search ............... 235/375, 235/383, 385; 705/22, 28; 340/572.1, 585
See application file for complete search history.

(56) References Cited

U.S. PATENT DOCUMENTS 7,096,221 B2* 8/2006 Nakano ............... 707/10
7,178,349 B2* 2/2007 Roh et al. ............... 62/125
7,292,146 B1* 11/2007 Nguyen et al. ............ 340/572.1
2005/0137943 A1* 6/2005 Holzman ............... 705/28
2005/0258961 A1* 11/2005 Kimball et al. .......... 340/572.1
2006/0271695 A1* 11/2006 Lavian ............... 709/229

FOREIGN PATENT DOCUMENTS

| KR | 2001-77246 | 8/2001 |
| KR | 2002-13125 | 2/2002 |
| KR | 2003-7865  | 1/2003 |
| KR | 2004-32649 | 4/2004 |

* cited by examiner

*Primary Examiner*—Karl D. Frech
*Assistant Examiner*—April A Taylor
(74) *Attorney, Agent, or Firm*—Cha & Reiter, LLC

(57) ABSTRACT

The present invention discloses a refrigerator inventory management method using a mobile phone. The inventory management method of the present invention includes updating, at the refrigerator, storage information on items stored in the refrigerator by scanning RF tags attached to the items whenever a door of the refrigerator is opened, transmitting the storage information to a mobile terminal, updating the storage information stored in the mobile terminal with the storage information transmitted from the refrigerator, and displaying, comparatively, the items of the updated storage information and items for the specific list set by a user or registering the items included in the specific list but not in the updated storage information as purchase information. In another aspect if there is a recipe for food preparation available from a website, the mobile terminal registers the items included in the recipe but which are not in the updated storage information as purchase information.

4 Claims, 8 Drawing Sheets

FIG. 8
[ 8A ]
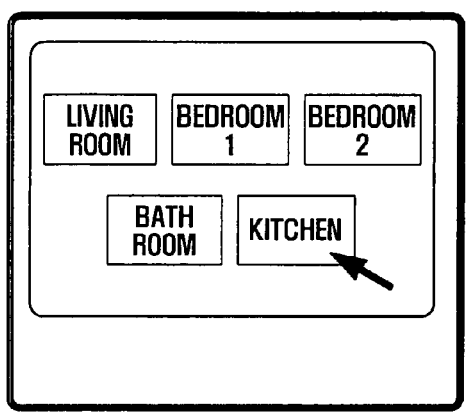
[ 8B ]
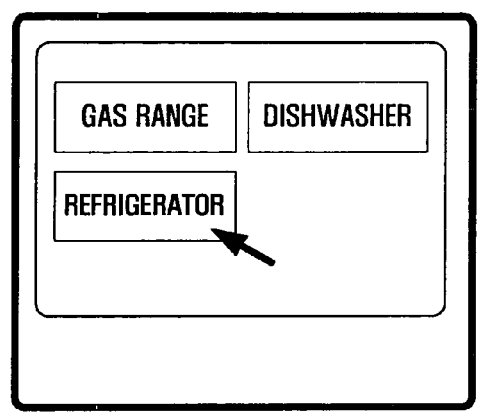
[ 8C ]
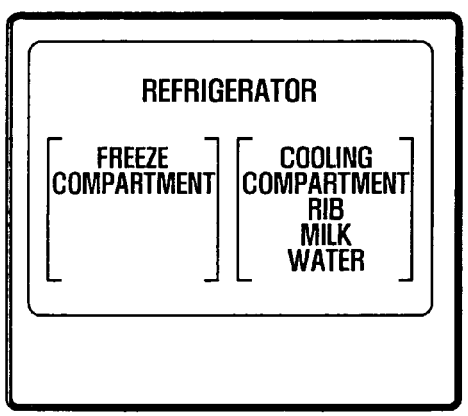
[ 8D ]
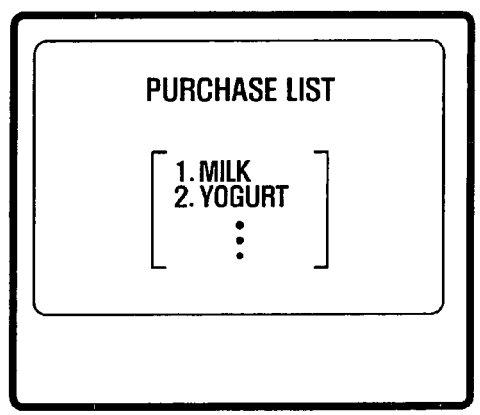

INVENTORY MANAGEMENT METHOD FOR REFRIGERATOR USING MOBILE TERMINAL

CLAIM OF PRIORITY

This application claims priority, pursuant to 35 USC 119, to that patent application entitled "Inventory Management Method For Refrigerator Using Mobile Terminal," filed in the Korean Intellectual Property Office on Dec. 30, 2005 and assigned Ser. No. 2005-0134834, the contents of which are incorporated herein by reference.

BACKGROUND OF THE INVENTION

1. Field of the Invention

The present invention relates to a mobile communication system and, in particular, to a method for inventory management of items inside a refrigerator, which allows a person to monitor the items with a mobile terminal even from outside of the residence in real time through a mobile communication network.

2. Background of the Related Art

A refrigerator is an electrical appliance that helps preserve food stored in a storage space by circulating coolant gas. Recently manufactured refrigerators are equipped with various functions in addition to the typical refrigeration and cooling, so as to be able to input data, display temperature inside the cooling and freezing compartments, and even access to the Internet.

Particularly, refrigerators may be provided with a built-in LCD display such that the information on the temperatures of the freezing and cooling compartments and the states of the items may be monitored and/or recorded. In this case, it is required to write or input the purchases and expiration date information in order to manage the inventory and expiration dates of the items. Recently, a radio frequency identification techniques (RFID) in which an RF tag is used, was disclosed to avoid the time-consuming and inconvenient input manipulation of the conventional refrigerator. In the RF tag based management method, the RF tag is attached to the items to be stored in the refrigerator. The RF tag is designed to contain information associated with the corresponding item. The RF tag broadcasts the associated information when a signal of a predetermined frequency is detected. The RF tag scanner is designed to radiate the frequency so that the information transmitted from the RF tag may be collected. In the meantime, a data input technique for refrigerators in which the purchase information is input through wire/wireless internet for simplifying the manual input process.

However, even though these conventional techniques are related to the efficiency of inputting the information of the items contained in the refrigerator, they provided limited efficiency and do not support enabling the user managing the items in real-time by monitoring the items especially at a remote place.

SUMMARY OF THE INVENTION

The present invention has been made in an effort to solve the above problems and provides additional advantages, by providing a method for providing an inventory management of items preserved in the refrigerator using a mobile terminal.

One aspect of the present invention is to provide a method for inventory management of items preserved in a refrigerator that is capable of monitoring the information on the items in real-time so as to use the information for making a purchase decision.

Another object of the present invention is to provide a method for inventory management of the refrigerator, which provides the user with the real-time information on the items in the refrigerator using a mobile terminal communicating with the refrigerator through a wireless communication network.

In one embodiment, the inventory management method of a mobile terminal for a refrigerator, in accordance with the present invention, includes updating, at the refrigerator, storage information on items stored in the refrigerator by scanning RF tags attached to the items whenever a door of the refrigerator is opened, transmitting the storage information to the mobile terminal, updating the storage information previously stored in the mobile terminal with the storage information transmitted from the refrigerator, displaying the items of the updated storage information and items for the specific list set by a user or registering the items included in the specific list but not in the updated storage information as purchase information and registering items included in a recipe received from a website through Internet but not in the updated storage information as purchase information.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings:

FIGS. 8A to 8D are exemplary views illustrating steps for checking any change occurred in refrigerator.

DETAILED DESCRIPTION OF THE INVENTION

The embodiments of the present invention will be described hereinafter with reference to the accompanying drawings in detail.

In the following detailed description, only the preferred embodiment of the present invention has been shown and described, simply by way of illustration of the best mode contemplated by the inventor(s) of carrying out the invention.

As will be understood, the invention is capable of modification in various respects, all without departing from the invention. Further, in the following description of the present invention, a detailed description of well-known functions and structures incorporated herein will be omitted when it may obscure the subject matter of the present invention.

The mobile terminal can be a cellular phone, a personal digital assistant (PDA), a smart phone, and etc.

A gateway such as wireless communication gateway, e.g., ZigBee gateway is used for enabling communication between the mobile terminal and electric appliances, operating in different networks. The ZigBee operates using a communication protocol standardized in IEEE 802.15.4.

A recipe provider provides a recipe and information on the items for the recipe in response to a request through a network, e.g., Internet.

Figure 1:
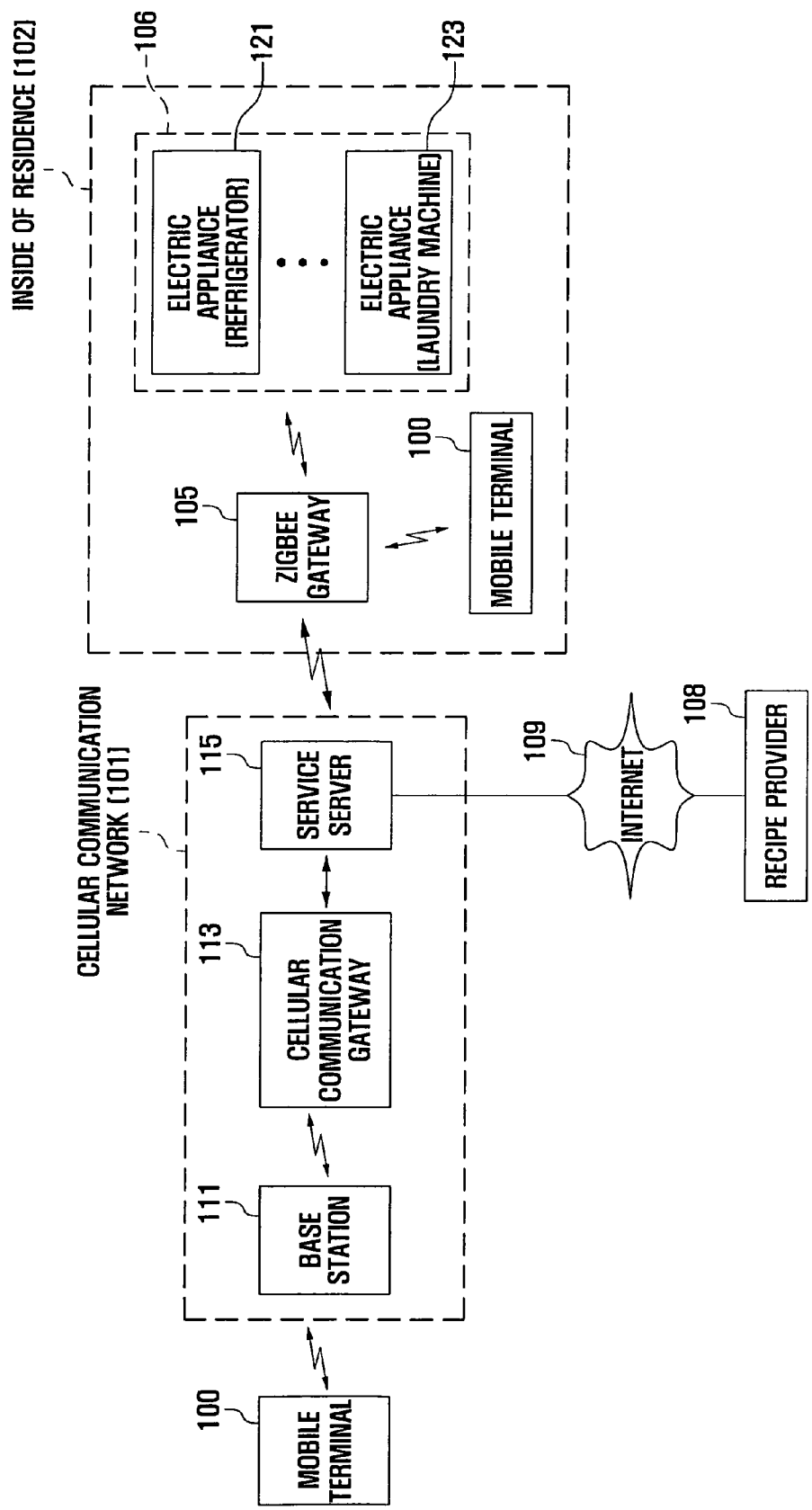
FIG. 1 is a block diagram illustrating an inventory management system implemented with a home network and a cellular network according to an embodiment of the present invention.

FIG. 1 is a block diagram illustrating an inventory management system implemented with a home network 102 and a cellular network 101 according to an embodiment of the present invention.

The system includes a mobile terminal 100, a cellular communication network 101. a home network 102. and an optional recipe provider 108 connected to an Internet 109. The cellular communication network includes a base station 111, a cellular communication gateway 113, and a service server 115. The home network 102 includes a gateway 105 (e.g., ZigBee) and electrical appliances 106 such as illustrated refrigerator 121 and laundry machine 123. The ZigBee gateway 105 can communicate with the mobile terminal and interoperate with the cellular communication network 101.

Referring to FIG. 1, the system is implemented such that the user can retrieve and update the information on the items contained in the refrigerator 121 using the mobile terminal 100 through the ZigBee gateway 105 inside the residence. Or the user can monitor and update the information on the items contained in the refrigerator 121 even at a remote place outside the residence, using the mobile terminal 100 through a cellular network.

Also, the user can download the information regarding an items received from the recipe provider 108 through wireless Internet 109 and compare the item information with the information on the items stored in the refrigerator 121 such that comparison result can be used for making a purchase decision.

The inside network of the residence, preferably, is implemented with the ZigBee gateway 105 which operates with the ZigBee communication protocol standardized in IEEE 802.15.4. The inside network is not limited to the ZigBee, but may be implemented with other well-known communication technologies such as a Bluetooth, a UWE, IEEE 1394, etc.

The communication between the cellular communication gateway 113 outside the residence and the ZigBee gateway 105 inside the residence is carried out with any of a Code Division Multiple Access (CDMA), a Global System for Mobile communication (GSM), an Universal Mobile Telecommunications System (UMTS), a wireless Internet, etc.

Figure 2:
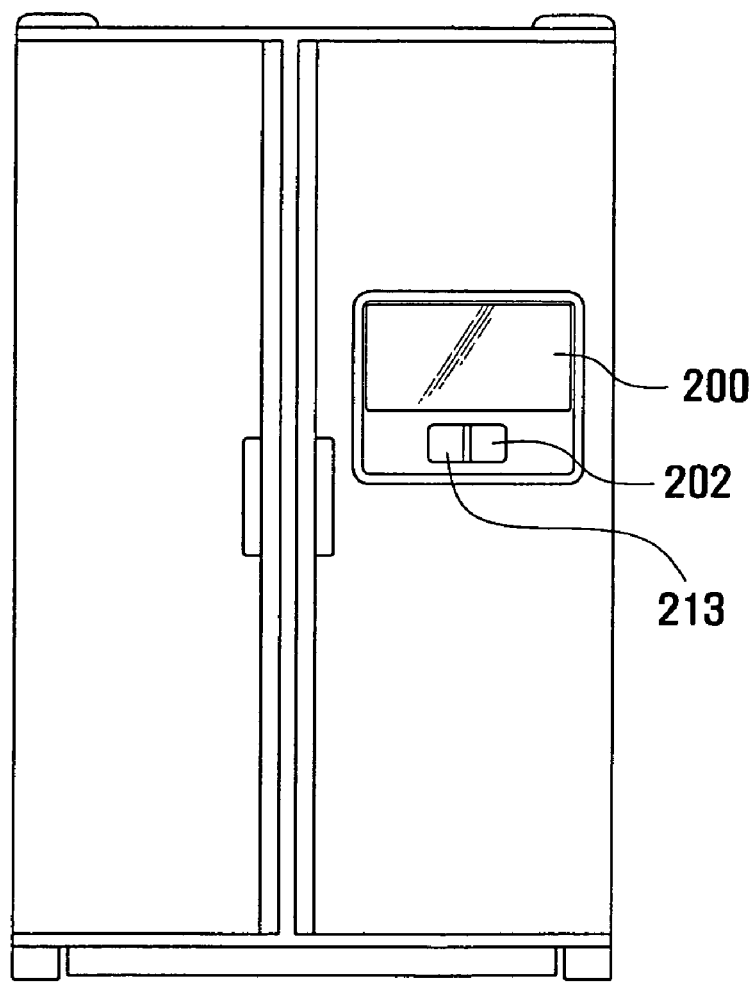
FIG. 2 is a schematic view illustrating a refrigerator according to an embodiment of the present invention.

FIG. 2 is a schematic view illustrating a refrigerator according to an embodiment of the present invention. The refrigerator includes a display 200 for displaying the information regarding the status of the refrigerator and items contained inside the refrigerator, a ZigBee communication module 202 for supporting wireless communication with the ZigBee gateway 105 of FIG. 1, and a RF tag scanner 213 for scanning the RF tag attached to an item.

Figure 3:
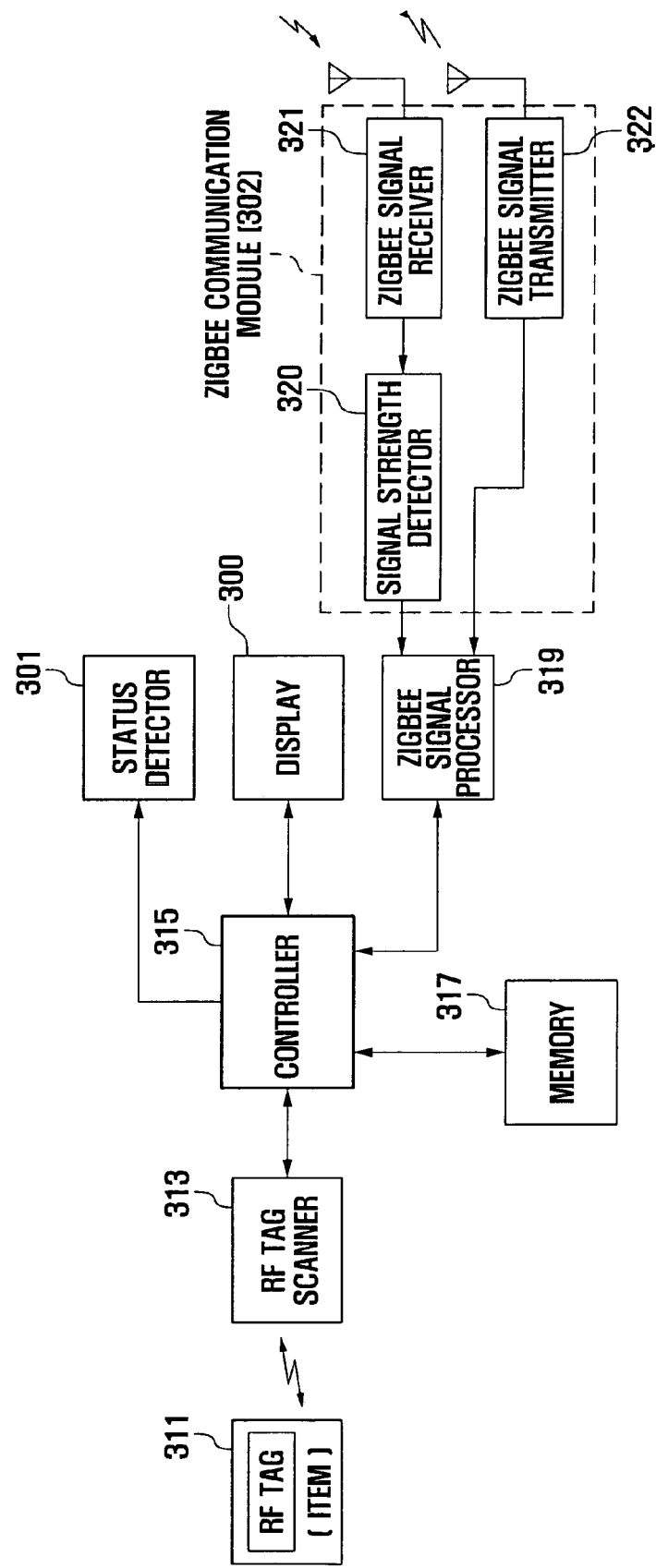
FIG. 3 is a block diagram illustrating the structure of the refrigerator for supporting RF tag scanning function and Zig-Bee communication.

FIG. 3 is a block diagram illustrating the structure of the refrigerator for supporting RF tag scanning function and ZigBee communication.

In FIG. 3, the RF tag scanner 313 is installed so as to scan the RF tag 311 inside and outside the refrigerator. The information on the items scanned by the RF tag scanner 313 is processed by a controller 315 and then stored in memory 317. The controller 315 reads the information on the items contained in the refrigerator from the memory 317 and transmits the information to the mobile terminal 100 when there is a request for that information through the ZigBee communication module 302 and a ZigBee signal processor 319.

The refrigerator includes a status detector 301, which detects change of state of the door, i.e., opening and/or closing of the door, such that the status detector 301 checks the items moving into and out of the refrigerator whenever the door is opened or closed and sends the check result to the controller 315.

If the number of any items is changed, the controller 315 controls processing such that the RF tag scanner 313 scans the RF tag attached to the item, updates the information in the memory 317 on the basis of the scaned result, and then transmits the updated information to the mobile terminal 100 through the ZigBee communication module 302.

Figure 4:
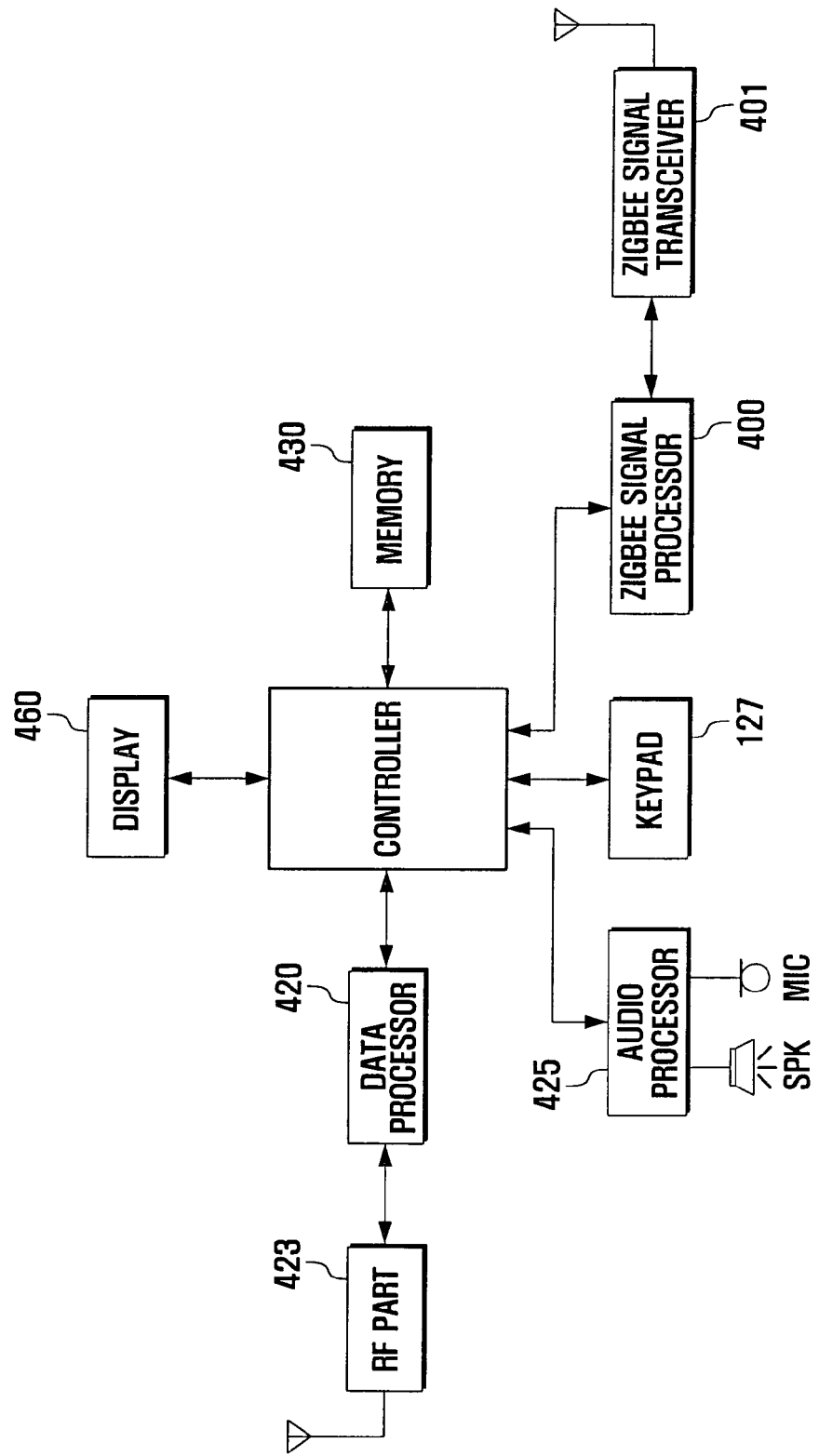
FIG. 4 is a block diagram illustrating a mobile terminal according to an embodiment of the present invention.

FIG. 4 is a block diagram illustrating a mobile terminal including a Zigbee communication module according to an embodiment of the present invention.

The mobile terminal ZigBee communication module includes a Radio Frequency (RF) part 423, a data processor 420, an audio processor 425, a memory 430, a controller 410, a second display 460, a keypad 427, a ZigBee signal processor 400, and a ZigBee signal transceiver 401.

The RF part 423, which performs an RF communication, includes an RF transmitter that up-converts and amplifies the signal to be transmitted and an RF receiver that low-noise amplifies and down-converts the received signal.

The data processor 420 includes a transmitter that performs encoding and modulation on the signal to be transmitted and a receiver that performs demodulation and decoding on the received signal. The data processor 423 can be implemented with a modem and a codecs. Here, the codec are a data codec for processing the packet data and an audio codec for processing the audio signal such as voice.

The audio processor 425 replays the received audio signal outputted from the audio codec and transmits the audio signal generated from the microphone.

The memory 430 can be divided into a program memory part and a data memory part. The program memory part stores the programs for controlling the overall operation of the mobile terminal, the program for managing the items stored in the refrigerator in accordance with the present invention, and the program for comparing the item received through the wireless Internet with the items stored in the refrigerator and storing the comparison result as the purchase information. Also, the data memory can temporally store the data generated while operating the programs. Particularly, the memory 430 can store the information on the items stored in the refrigerator 121 and the items to be purchased.

The controller 410 controls the overall operation of the mobile terminal. Also, the controller 410 can include the data processor 420. Also, the controller 410 controls the ZigBee communication such that the information stored in the memory 430 can be updated though the ZigBee communication inside the residence and through the cellular communication outside the residence.

The display 460 displays the video signal with the items information collected by the refrigerator and received though the Internet, under control of the controller.

The keypad 427 is provided with a plurality of number and character keys and function keys for manipulating various functions.

The ZigBee signal transceiver 401 transmits the signal outputted from the ZigBee signal processor 400 to the ZigBee gateway 105 or the cellular gateway 113 of FIG. 1 through the antenna, and transfers the information on the items in the refrigerator 121 received through the ZigBee gateway 105 or the cellular gateway 113 to the ZigBee signal processor 400.

Figure 5:
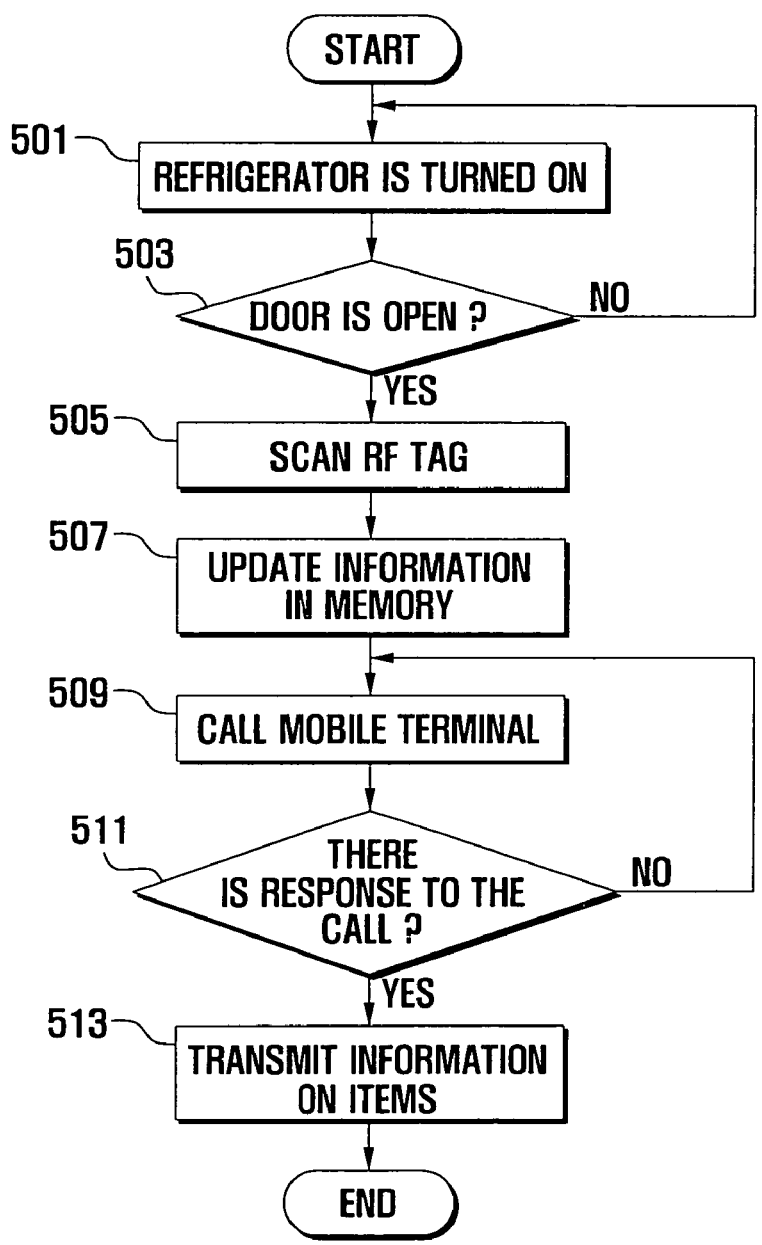
FIG. 5 is a flowchart illustrating a procedure for transmitting the information on the items stored in the refrigerator to the mobile terminal.

FIG. 5 is a flowchart illustrating a procedure for transmitting the information on the items stored in the refrigerator 121 to the mobile terminal 100.

The controller 315 of the refrigerator (FIG. 3) checks that the refrigerator is turned on by means of the status detector 301 at step 501, and then determines whether the door of the refrigerator was opened and closed at step 503. If the door was opened and closed, the controller 315 determines whether any of the items were moved into or out of the refrigerator such that the controller controls the RF tag scanner to scan all of the items having RF tags inside the refrigerator at step 505. The controller 315 updates the information stored in the memory 317 on the basis of the scanned results 507. The controller 315 calls the mobile terminal according to the ZigBee protocol (IEEE 802.15.4) between the ZigBee signal transmitter 322 and the ZigBee gateway 195 inside the residence, or calls the mobile terminal 100 through the cellular gateway 113 of the cellular communication system outside the residence. The controller 315 determines whether there is a signal received through a ZigBee signal receiver 321 and a signal strength detector 320 in response to the call after calling the mobile terminal. If there is a response signal, the controller transmits the updated information to the mobile terminal 100.

Figure 6:
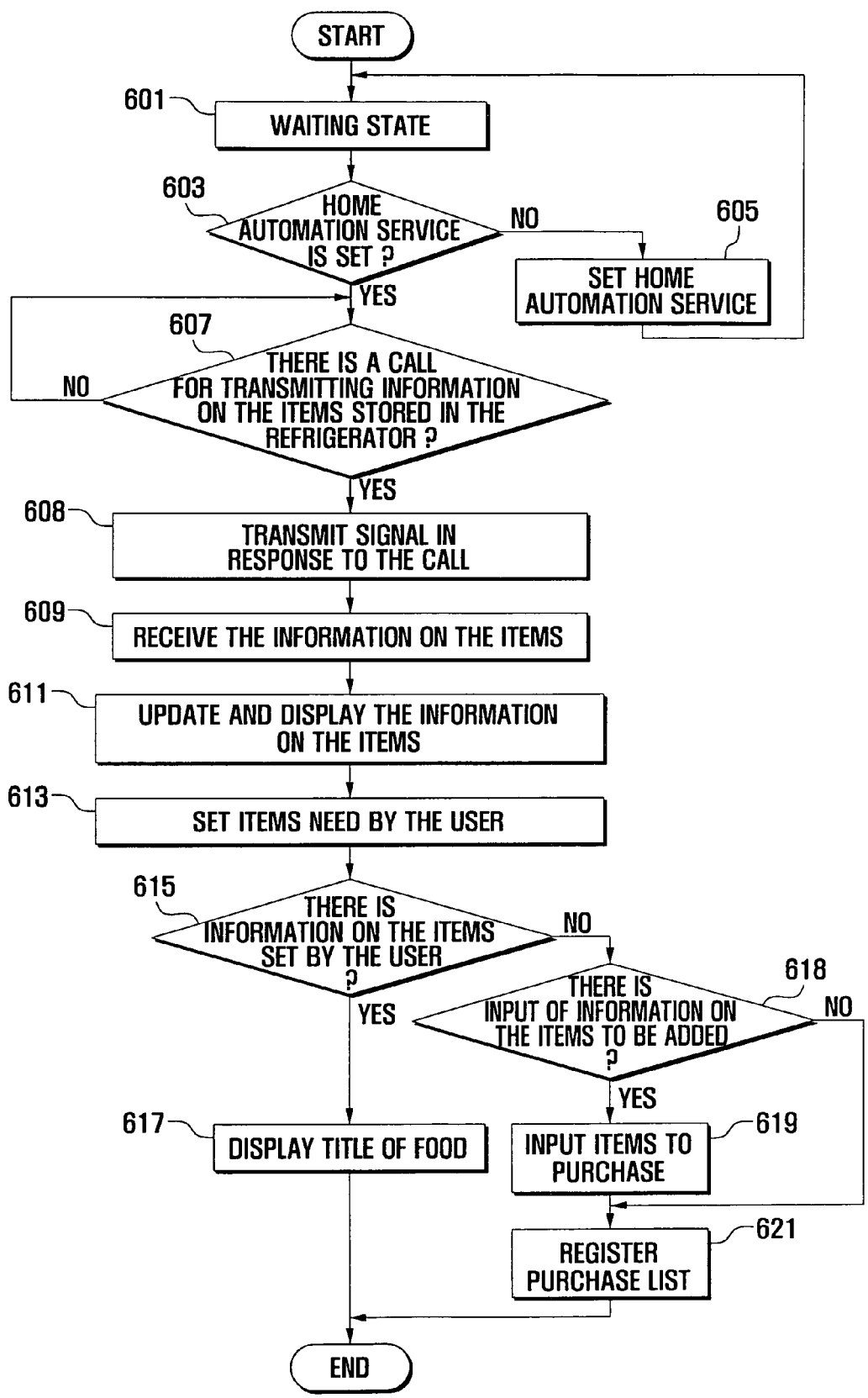
FIG. 6 is a flowchart illustrating a procedure, at the mobile terminal, for managing the information of the items received from the refrigerator.

FIG. 6 is a flowchart illustrating a procedure, at the mobile terminal, for managing the information of the items received from the refrigerator.

In waiting state of step 601, the mobile terminal 100 determines whether a home automation service is set at step 603. If the home automation service is not set, the terminal sets the home automation service at step 605. On the other hand, when the home automation service is set, the controller prepares for a call. The terminal controller 410 determines whether there is a signal received through the ZigBee signal transceiver 401 as a ZigBee call rather than a wireless call for regular communication, at step 607. This is a calling signal for transmitting the information on the items updated from refrigerator. If there is a call, the controller 410 transmits a response signal to the refrigerator at step 608, receives the information on the items, updates the information on the items in the memory 430 at step 611, and notifies, through the display 410, whether any change has occurred in the kitchen as shown in FIG. 8A. The user can also check the updated information, as shown in FIG. 8C, by sequentially selecting "kitchen," as shown in FIG. 8A and "refrigerator" as shown in FIG. 8B at step 613. The controller 410 allows the user to set the information on the items and the number of items to be replenished. Also, the controller 410 compares the information on the items and the number of items stored in the memory 430 with the information, updated at step 611, on the items and the number of items, at step 615.

If there are items to be replenished, the controller displays those items on the display 460 at step 617. In the meantime, if it is determined that there is not enough of a certain item or the item has been depleted, the controller determines whether there is an input for replenishing the item at step 618. If there is no need for replenishment, the controller displays the information as it is. On the other hand, if there is a need for replenishment, the controller allows the user to input additional information through the keypad 127, at step 618, so as to register the information as a purchase list into the memory 430, as shown in FIG. 8D, at step 619.

Figure 7:
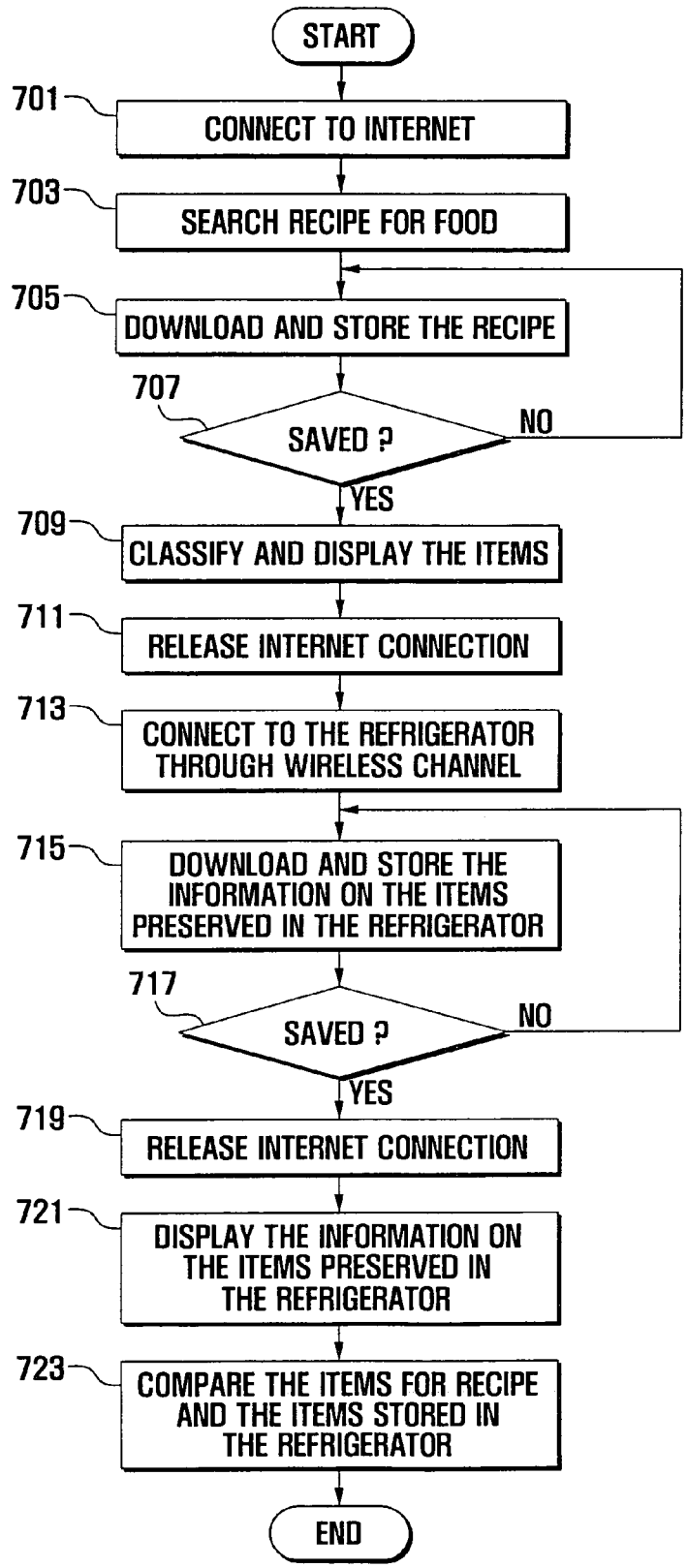
FIG. 7 is a flowchart illustrating a purchase management procedure by comparing the items required for a recipe provided by a recipe provider through the wireless internet and the items contained in the refrigerator according to an embodiment of the present invention.

FIG. 7 is a flowchart illustrating a purchase management procedure wherein items required for a recipe provided by recipe provider 108 through the wireless internet 109 and the items contained in the refrigerator 121 are compared according to an embodiment of the present invention.

Assuming that a person decided to cook food and downloaded a recipe for a specific dish from the Internet, if the recipe is obtained, he/she may check whether all the items for the selected recipe are contained in the refrigerator 121. In order to check whether the necessary items are available, it is required that he/she opens the door of the refrigerator 121 when he/she is inside the residence. In the present invention, the user can check the items contained in the refrigerator 121 when in or out of the residence using the mobile terminal without opening the door of the refrigerator 121 such that the user can make a purchase list for the items to be bought. The list can than be used to make a decision as to which items to buy.

Referring to FIG. 7, if the user selects an Internet connection while the mobile terminal 100 is connected to a home network 102 or a cellular network 101 is in a menu mode at step 701, the mobile terminal 100 is connected the Internet wirelessly through the ZigBee gateway 105 or the cellular communication gateway 113. If the connection is successfully completed, the user searches a recipe from the recipe provider 108 at step 703 and then downloads and stores the recipe into the memory 430 under control of the controller 410 at step 705. The controller 410 classifies the items for the recipe and then displays the classified items on the display 460 at step 707. Once the recipe search is finished, the Internet connection is released by the controller 410 and the mobile terminal 100 connects to the refrigerator 121 of FIG. 3 through the cellular communication gateway 113 and the ZigBee gateway 105 using the wireless ZigBee protocol (IEEE802.15.4). The controller 315 of the refrigerator 121 of FIG. 3 reads the information on the items stored from the memory 317 and then transmits the information to the mobile terminal 100 when there is a request for the information from the mobile terminal 100. Upon receiving the information, the controller 410 of the mobile terminal stores the information into the memory 430 at step 715. When the information is completely stored at step 717, the connection is released and the information is displayed at step 721. Controller 410 compares the items for the recipe downloaded at step 705 through the Internet and the items received at step 715 from the refrigerator, and then the controller 410 stores the comparison results, i.e., items not available in the refrigerator into the memory 430 as the purchase list, at step 723. The purchase list can be used to make a decision regarding buying the items.

As described above, in the present invention the mobile terminal can download the information on the items contained in the refrigerator anywhere and anytime as the mobile terminal can connect to the home network or/and the cellular network, such that the user can use the information for making a purchasing decision.

The present invention is also advantageous in that the user can download a recipe from a website and compare the items for the recipe and the items contained in the refrigerator even at a remote place, whereby the comparison result, as a purchase list, can be used for purchasing goods.

The present invention is disclosed in the preferred embodiments shown in this specification and in the accompanying drawings. This disclosure is not intended to limit the scope of the invention, but to serve only for illustrative purposes. It should be understood to the ordinary person skilled in the art that various changes or modifications of the embodiments are possible without departing from the spirit of the invention.

What is claimed is:

1. An inventory management method of a mobile terminal for a refrigerator, comprising:
   updating, at the refrigerator, storage information on items stored in the refrigerator by scanning RF tags attached to the items whenever a change of state of a door of the refrigerator is detected;
   transmitting the storage information to the mobile terminal;
   updating the storage information stored in the mobile terminal with the updated storage information transmitted from the refrigerator; and
   displaying the items of the updated storage information and items for a recipe set by a user or registering the items included in the recipe but not in the updated storage information as purchase information.

2. An inventory management method of a mobile terminal for a refrigerator, comprising:
   updating, at the refrigerator, storage information on items stored in the refrigerator by scanning RF tags attached to the items whenever a door of the refrigerator is opened;
   transmitting the storage information to the mobile terminal;
   updating, at the mobile terminal, the storage information previously stored in the mobile terminal with the storage information transmitted from the refrigerator;
   downloading, at the mobile terminal, a recipe having items required for food from a website through Internet; and
   displaying the items of the updated storage information and the items for the recipe or registering the items included in a recipe but not in the updated storage information as purchase information.

3. An inventory management method of a mobile terminal for a refrigerator, comprising:
   updating, at the refrigerator, storage information on items stored in the refrigerator by scanning RF tags attached to the items whenever a door of the refrigerator is opened;
   transmitting the storage information to the mobile terminal;
   updating the storage information previously stored in the mobile terminal with the storage information transmitted from the refrigerator;
   displaying the items of the updated storage information and items for a recipe set by a user or registering the items included in the recipe but not in the updated storage information as purchase information; and
   registering items included in a recipe received from a website through Internet but not in the updated storage information as purchase information.

4. The inventory management method of claim 3, wherein the refrigerator transmits the storage information to the mobile terminal using a ZigBee protocol.

* * * * *